United States Patent
Xie et al.

(10) Patent No.: US 11,082,847 B2
(45) Date of Patent: Aug. 3, 2021

(54) COVERT PHYSICAL LAYER SLOPE AUTHENTICATION METHOD IN WIRELESS COMMUNICATIONS AND APPARATUS

(71) Applicant: Shenzhen University, Shenzhen (CN)

(72) Inventors: Ning Xie, Shenzhen (CN); Li Zhang, Shenzhen (CN); Hui Wang, Shenzhen (CN)

(73) Assignee: Shenzhen University, Shenzhen (CN)

( * ) Notice: Subject to any disclaimer, the term of this patent is extended or adjusted under 35 U.S.C. 154(b) by 188 days.

(21) Appl. No.: 16/574,166

(22) Filed: Sep. 18, 2019

(65) Prior Publication Data
US 2020/0015085 A1    Jan. 9, 2020

Related U.S. Application Data

(63) Continuation of application No. PCT/CN2017/105070, filed on Sep. 30, 2017.

(51) Int. Cl.
*H04W 12/069* (2021.01)
*H04W 52/36* (2009.01)
*H04B 1/707* (2011.01)

(52) U.S. Cl.
CPC ......... *H04W 12/069* (2021.01); *H04W 52/36* (2013.01); *H04B 1/707* (2013.01)

(58) Field of Classification Search
CPC ... H04W 12/069; H04W 52/36; H04W 80/02; H04W 52/362; H04W 52/247; H04W 12/06; H04B 1/707; H04L 5/00
See application file for complete search history.

(56) References Cited

U.S. PATENT DOCUMENTS 9,585,009 B2 *  2/2017  Ta ..................... H04W 12/02
10,051,581 B2 *  8/2018  Wang ................... H04W 48/08
(Continued)

FOREIGN PATENT DOCUMENTS

CN    104168562 A  * 11/2014
CN    106100710 A  * 11/2016

OTHER PUBLICATIONS

Paul L. Yu, John S. Baras, and Brian M. Sadler. "Physical-layer authentication." IEEE Transactions on Information Forensics and Security 3.1 (2008): 38-51. (Year: 2008).*

(Continued)

*Primary Examiner* — Robert B Leung
*Assistant Examiner* — Sameera Wickramasuriya
(74) *Attorney, Agent, or Firm* — Jeffrey Pearce (57) ABSTRACT

For wireless communication method, a to-be-transmitting signal is divided into (n+1) packets using a key pre-agreed to by a transmitter and a receiver, where n is a positive integer. The to-be-transmitted signal comprising a regular signal and a tag signal, said tag signal forming an authentication signal. When the difference between received amplitude values of the regular signal and tag signal fail to meet a first pre-determined requirement, a first power parameter adjustment factor is determined for the n packets preceding an (n+1)th packet and a second power parameter adjustment factor is determined for the (n+1)th packet, as well as an energy-limited condition of the to-be-transmitted signal power. The transmitted power of the respective (n+1) packets is then adjusted according to the corresponding power parameter adjustment factor before the to-be-transmitted signal is transmitted.

10 Claims, 6 Drawing Sheets

(56) References Cited

U.S. PATENT DOCUMENTS

| | | | | |
|---|---|---|---|---|
| 2011/0183683 A1* | 7/2011 | Das | ...................... | H04W 60/00 |
| | | | | 455/456.1 |
| 2013/0163761 A1* | 6/2013 | Baras | ................... | H04L 9/0875 |
| | | | | 380/270 |
| 2015/0131641 A1* | 5/2015 | Ong | .................... | H04W 52/242 |
| | | | | 370/338 |
| 2015/0281908 A1* | 10/2015 | Venkatraman | ...... | H04W 52/245 |
| | | | | 455/456.6 |
| 2016/0066227 A1* | 3/2016 | Townend | ............. | H04L 5/0048 |
| | | | | 370/331 |
| 2017/0019865 A1* | 1/2017 | Wang | ................. | H04W 52/241 |

OTHER PUBLICATIONS

S. Jain and J. S. Baras, "Preventing wormhole attacks using physical layer authentication," 2012 IEEE Wireless Communications and Networking Conference (WCNC), 2012, pp. 2712-2717, doi: 10.1109/WCNC.2012.6214260. (Year: 2012).*

P. L. Yu, J. B. Perazzone, B. M. Sadler and R. S. Blum, "Authenticated side channel via physical layer fingerprinting," 2016 IEEE Conference on Communications and Network Security (CNS), 2016, pp. 631-635, doi: 10.1109/CNS.2016.7860562. (Year: 2016).*

Jain, Sonal, Muzzammil Hussain, and Rama Murthy Garimella. "Primary user authentication in cognitive radio network using authentication tag." 2016 International Conference on Recent Advances and Innovations in Engineering (ICRAIE). IEEE, 2016. (Year: 2016).*

* cited by examiner

COVERT PHYSICAL LAYER SLOPE AUTHENTICATION METHOD IN WIRELESS COMMUNICATIONS AND APPARATUS

CROSS-REFERENCE TO RELATED APPLICATIONS

This application is a "bypass" continuation under 35 U.S.C. § 111(a) of international (Patent Cooperation Treaty—PCT) application No. PCT/CN2017/105070 filed Sep. 30, 2017, for "Covert Physical Layer Slope Authentication Method in Wireless Communications and Apparatus".

TECHNICAL FIELD

The present disclosure relates to communication devices, and in particular to a wireless communication method and apparatus.

BACKGROUND ART

There are three main physical layer authentication technologies. The first authentication technology is the Spread Spectrum Authentication method (Auth-SS), in which the basic idea is to use traditional direct-sequence spread-spectrum or frequency-hopping technology. The second one is based on the Auth-TDM (Authentication with Time Division Multiplexed Tag) scheme, in which the basic idea is that the transmitting device periodically sends information signals and tag information alternately. After receiving the signal, the receiving device directly extracts the desired tag information to implement authentication of the signal. The third authentication technology is Authentication with Superimposed Tag (Auth-SUP). The basic idea in Auth-SUP is to use a key to superimpose the tag information on the information signal. The transmitting device simultaneously transmits the signal, and after the receiving device receives the signal, the tag information in the superimposed signal is extracted by using the key to achieve the purpose of signal authentication.

The above three physical layer authentication technologies (Auth-TDM, Auth-SS, and Auth-SUP) expose the fact that authentication information is included. Among them, Auth-SS and Auth-TDM technologies are more likely to attract the attention of other users in the scenario, especially hostile users, compared to conventional signals that do not contain authentication information. Hostile users analyze, counterfeit or tamper with the signal, so that the legitimate receiving device will not be able to authenticate the desired signal.

DETAILED DESCRIPTION

The technical solutions in the embodiments of the present invention will be clearly and completely described in the following with reference to the accompanying drawings. It is apparent that the described embodiments are only some of the embodiments of the invention, and not all possible embodiments. All other embodiments obtained by those skilled in the art based on the embodiments of the present invention without creative efforts are within the scope of the present invention.

It should be noted that the terms "first" and "second" and the like in the specification and claims of the present invention and the above drawings are used to distinguish different objects, and are not intended to describe a specific order. Furthermore, the terms "comprises" and "comprising" are intended to cover a non-exclusive inclusion. For example, a process, method, system, product, or device that "comprises" a series of steps or units is not limited to the listed steps or units, but optionally also includes steps or units not listed, or, other steps or units optionally inherent to these processes, methods, products or equipment.

The disclosure discloses a wireless communication method and device, which can improve the security of information transmission. The details are described below.

Figure 1:
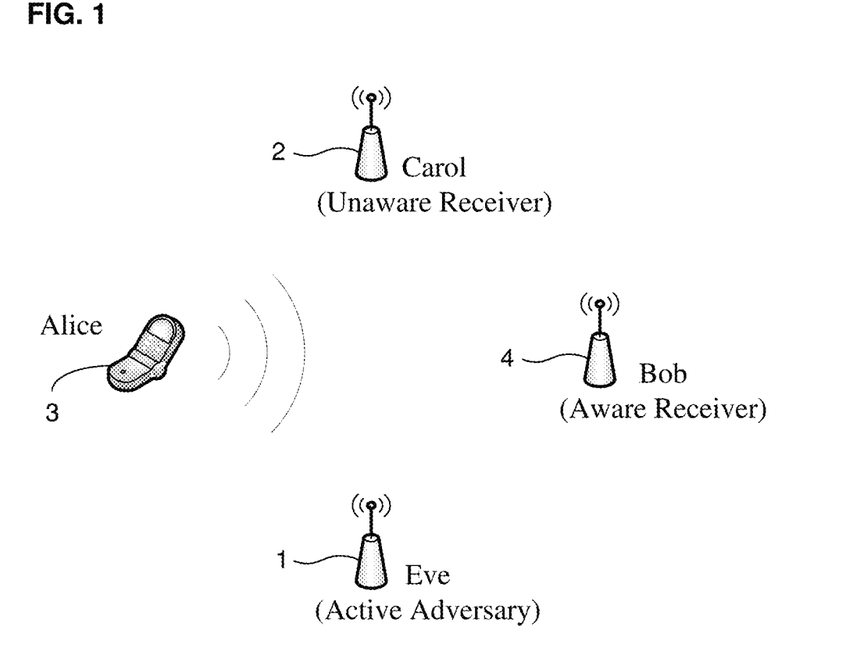
FIG. 1 is a schematic structural diagram of a communication system according to some embodiments.

Please refer to FIG. 1. FIG. 1 is a schematic diagram of a model of a communication system according to an embodiment. As shown in FIG. 1, the communication system may include a transmitting device 3 (shown as Alice), a receiving device 4 (shown as Bob), an actively adversarial audio monitor device 1 (shown as Eve) and an unaware audio monitor device 2 (Carol).

The transmitting device 3 (Alice) is authorized and is mainly used for transmitting a label signal that needs to be authenticated. A signal with a label added is called a label signal, and a signal without the label is called a regular signal. The transmitting device may include, but is not limited to, a base station and user equipment. A base station (e.g., an access point) may refer to a device in an access network that communicates with a wireless terminal by one or more sectors, that is, coverage areas, over an air interface. The base station may convert received air frames into an IP packet, acting as a router between the wireless terminal and the rest of the access network, wherein the remainder of the access network may include an Internet Protocol (IP) network. The base station may also coordinate attribute management of the air interface. For example, the base station may be a GSM or CDMA base station (BTS, Base Transceiver Station) in, or may be a WCDMA base station (NodeB), or may be a LTE evolved base station (NodeB or eNB or e-NodeB, evolutional Node B). The user equipment may include, but is not limited to, a smart phone, a notebook computer, a personal computer (PC), a personal digital assistant (PDA), a mobile internet device (MID), a wearable device (such as a smart watch), various types of electronic devices, such as smart bracelets and smart glasses, wherein the operating system of the user device may include, but is not limited to, an Android operating system, an IOS operating system, a Symbian operating system, a BlackBerry operating system and Windows Phone 8 operating system, and so on, are not limited in the embodiment of the present disclosure.

The receiving device 4 (Bob) is an authorized device, mainly used to receive signals, and the signal is authenticated to determine whether the signal is a regular signal or a tag signal. The receiving device may include, but is not limited to, a base station and user equipment. A base station (e.g., an access point) may refer to a device in an access network that communicates with a wireless terminal over one or more sectors over an air interface. The base station may be used to convert the received air frames to the IP packet as a router between the wireless terminal and the rest of the access network, wherein the remainder of the access network may include an Internet Protocol (IP) network. The base station may also coordinate attribute management of the air interface. For example, the base station may be a GSM or CDMA base station (BTS, Base Transceiver Station), or may be a WCDMA base station (NodeB), or may be an evolved LTE base station (NodeB or eNB or e-NodeB, evolutional Node B), but the embodiment of the present disclosure is not limited to these. The user equipment may include, but is not limited to, a smart phone, a notebook computer, a personal computer (PC), a personal digital assistant (PDA), a mobile internet device (MID), a wearable device (such as a smart watch), various types of electronic devices, such as smart bracelets and smart glasses, etc., wherein the operating system of the user device may include, but is not limited to, an Android operating system, an IOS operating system, a Symbian operating system, a BlackBerry operating system, the Windows Phone 8 operating system and so on.

The monitoring device 1 (Eve) is an unauthorized receiving party (i.e., a hostile user), and mainly monitors signals sent by the transmitting device. Once the signal sent by the transmitting device is found to contain authentication information (i.e., a tag signal), the signal will be analyzed, and the hostile user will try to extract, destroy, and even tamper with the authentication information.

The monitoring device 2 (Carol) is a relatively neutral receiver, and may receive the signal transmitted by the transmitting device 3, but has no idea of the authentication method, and does not attempt to analyze whether the received signal contains the authentication information. It does not interfere with the signal received by the receiving device, and does not affect the authentication process of the signal by the receiving device.

It should be noted that the transmitting device 3, the receiving device 4, the monitoring device 1 and the monitoring device 2 in the communication system shown in FIG. 1 may all represent different groups of devices. That is, the number of the transmitting devices in the communication system is not limited to one, and the number of the receiving devices in the communication system described in FIG. 1 is not limited to one. Similarly, the number of monitoring devices 1 in the communication system described in FIG. 1 is not limited to only one, and the number of monitoring devices 2 in the communication system described in FIG. 1 is not limited to one.

In the communication system described in FIG. 1, it is assumed that the signal transmitted by the transmitting device is transmitted in blocks, expressed as $b=\{b_1, K, b_L\}$, the length of each block is L, and the signal blocks are independent and identically distributed random variables. Furthermore, the channels between different devices may be modeled as fast-fading channels, which means that the channel fading corresponding to different signal blocks is also independent. Based on the above assumptions, the signal received by the receiving device may be expressed as follows:

$$y_i = h_i x_i + n_i$$

where the original transmission signal code sequence $b=\{b_1, K, b_L\}$, is operated on, by code modulation, pulse shaping, and so on, to get $s_i$, and then the label signal is added to $s_i$, to get $x_i$. That is, $x_i$ contains the label signal and the information signal $h_i = l_i \eta_i$ is the channel response. In the present disclosure, we use the Nakagami channel, $\eta_i$, to represent a random variable of short-term fading, where $l_i = \lambda/4\pi d$ is the path loss, $\lambda = c/f_c$ is the signal wavelength, $c = 3 \times 10^8$ m/s, $f_c$ is the carrier frequency of the signal, d is the distance between transmitting device and receiving device, and $n_i = n_{i1}, n_{i2}, \ldots, n_{iL}, n_{ik} \sim CN(0, \sigma^2_n)$ is Gaussian white noise.

Specifically, the transmitter device can divide the signal to be transmitted into (n+1) groups by using the pre-agreed key. Further, the transmitting device can receive feedback information sent by the receiving device. If the difference between the amplitude of the conventional signal and that of the label signal does not meet the requirements, the transmitter device can determine a power parameter adjustment factor of n packets. The conventional signal is a non-authenticated signal received by the receiving device, and the label signal is an authenticated signal received by the receiving device. According to the power parameter adjustment factor of the N packets and the energy feedback limitation condition of the signal power to be transmitted, the power parameter adjustment factor of the remaining packets may be determined. For each packet, the signal of the packet is power-adjusted according to the power parameter adjustment factor of the packet, and the signal to be transmitted is transmitted after adjusting the power. After receiving the signal, the receiving device can group the signal according to the predetermined key and calculate the power of each group. The test statistics are determined according to the power of each grouping, and whether or not the test statistics are greater than or equal to the preset statistical threshold is further determined. If so, it is determined that the signal is a label signal, and if not, it is determined that the signal is a conventional signal, in which the label signal is an authentication signal received by the receiving device and the conventional signal is a non-authentication signal received by the receiving device. The receiving device knows the label signal and the encryption mode added by the transmitting device, and agrees with the transmitting device to use the used key in advance. The above-summarized physical layer authentication arrangement may be referred to as "slope authentication technology" (Auth-SLO).

It may be seen that before transmitting the to-be-sent signal, the transmitting device 3 uses the key agreed upon by the two parties to group the transmitted signals, and uses the determined power parameter adjustment factor to allocate and adjust the power of each group of signals. At the same time, the receiving device may also use the key agreed upon by the two parties to identify whether the received signal satisfies the power allocation feature of the signal transmitted by the transmitting device to achieve the purpose of information authentication. The whole process does not expose the authentication information, which can improve the concealment of signal transmission, and at the same time, improve the accuracy of information authentication.

Figure 2:
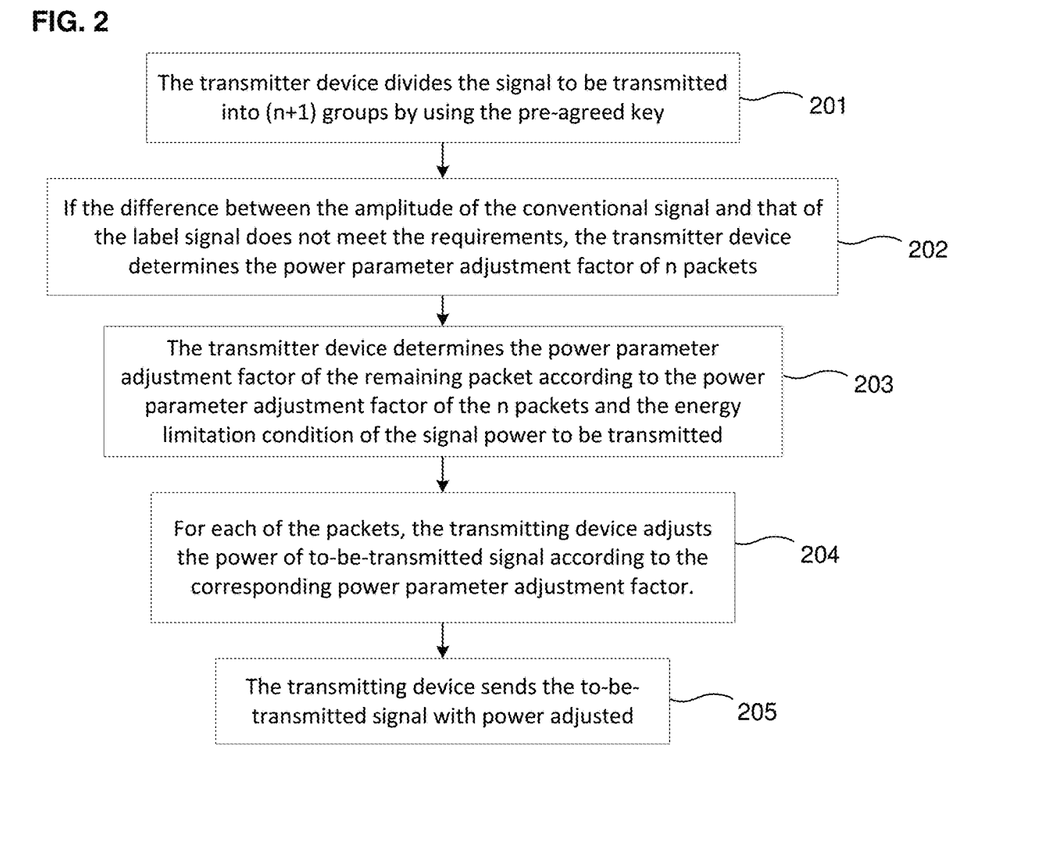
FIG. 2 is a schematic flowchart of a wireless communication method according to some embodiments.

The wireless communication method may be applicable to a transmitting device. As shown in FIG. 2, the wireless communication method may include the following steps:

In step 201, the transmitter device divides the signal to be transmitted into (n+1) groups/subsets using the pre-agreed key, where n is a positive integer. For ease of description, all embodiments of the present invention are illustrated by dividing them into two groups/subsets, namely n=1.

In one embodiment, before transmitting the to-be-transmitted signal, the transmitting device may divide the signal to be transmitted into multiple packets by using a pre-agreed key, where the number of specific packets and the length of each group of signals may be determined by a key that is pre-agreed upon and known by the receiving device and transmitting device.

For example, a N-length string of information signal and a N-length string of keys may be provided, where N is a positive integer. The number of 0s and 1s in the key may be the same. The information signal may be aligned with the key by the transmitting device, the bits in the information signal corresponding to 0 of the key may be divided into a first group, and the bits in the information signal corresponding to 1 of the key may be divided into a second group. That is, the information signal could be divided into two groups. For the sake of simplicity, the following description refers to only two groups.

It should be noted that each transmitter device receives the feedback information sent by the receiver device before transmitting the signal. The feedback information is used to indicate whether the difference between the amplitude of the conventional signal and that of the label signal meets the requirements.

Specifically, after each receiving device receives the signal sent by the transmitting device, the difference between the amplitude of the conventional (that is, regular) signal and that of the label signal (also referred to here as the "tagged signal") is calculated, and the difference is compared with the amplitude threshold. If the difference is less than or equal to the amplitude threshold, it indicates that the power of the transmitter device to send signals meets the requirements, and does not need to adjust the power. If the difference is greater than the amplitude threshold, it indicates that the power of the transmitter device to send signals does not meet the requirements, and the transmitter device needs to adjust the power in the next transmission signal. Among them, an amplitude threshold can be set in advance, in which the amplitude threshold and the preset value can be the best experimental value obtained when the bandwidth limitation of the label signal is consistent with that of the conventional signal through many experiments in advance, such as the amplitude threshold of 0. When the difference between the amplitude of the conventional signal and that of the label signal is less than or equal to the preset amplitude threshold, it shows that the bandwidth limitation of the label signal is consistent with that of the conventional signal. When the amplitude threshold is 0, it can be regarded as completely concealed. However, in general, the receiving device will have the influence of noise when processing the signal, and the amplitude threshold will not be 0, which can also be considered as concealed. In addition, the sensitivity of the hardware of the receiving device also causes the amplitude threshold not to be zero.

The conventional signal is a non-authenticated signal received by the receiving device, and the label signal is an authenticated signal received by the receiving device.

In the embodiment of the present invention, both conventional signals and label signals have their own spectrum expressions and amplitude functions.

Assuming that all elements in $s_i$ are 1, the spectral expression of conventional signals can be expressed as follows:

$$W_{normal}(e^{j\omega}) = \sum_{n=0}^{L-1} e^{-j\omega n} = e^{-j\omega(\frac{L-1}{2})} \frac{\sin(\frac{\omega L}{2})}{\sin(\frac{\omega}{2})} \quad (1.1)$$

Therefore, the corresponding amplitude function of the conventional signal is:

$$W_{Normal}(\omega) = \frac{\sin(\frac{\omega L}{2})}{\sin(\frac{\omega}{2})} \quad (1.2)$$

The spectrum expression of the label signal is as follows:

$$W_{Auth-SLO}(e^{j\omega}) = \sum_{n=0}^{L/2-1} \alpha e^{-j\omega n} + \sum_{n=L/2}^{L-1} \beta e^{-j\omega n} = \quad (1.3)$$

$$(\alpha e^{-j\omega(L/2-1)} + \beta e^{-j\omega(L-1)}) e^{-j\omega(\frac{L-2}{4})} \frac{\sin(\frac{\omega L}{4})}{\sin(\frac{\omega}{2})}$$

Therefore, the corresponding amplitude function of the tag signal is:

$$W_{Auth-SLO}(\omega) = \sqrt{2 + 2\alpha\beta\cos(\frac{\omega L}{2})} \frac{\sin(\frac{\omega L}{4})}{\sin(\frac{\omega}{2})} \quad (1.4)$$

Where $\alpha$ and $\beta$ are the power parameter adjustment factors to be determined.

When analyzing the spectrum of the signal, we can judge whether the signal is abnormal by detecting whether the spectrum of the signal exceeds the boundaries of the allocated frequency band. Therefore, the tag signal must conform to the bandwidth limitation consistent with the conventional signal in order to be considered as a covert authentication technology. Therefore, it is necessary to strictly limit the difference between $W_{Auth-SLO}(\omega)$ and $W_{Normal}(\omega)$. When $W_{Auth-SLO}(\omega)=W_{Normal}(\omega)$ is strictly limited, it can be seen from the expression of the amplitude function corresponding to the conventional signal and the expression of the amplitude function corresponding to the label signal that $\alpha\beta=1$ should be taken.

In Step 202. If the difference between the amplitude of the conventional signal and that of the label signal does not meet the requirements, the transmitter device determines the power parameter adjustment factor of n packets.

Specifically, the step of determining the power parameter adjustment factors for n packets includes:

The initial values of n power parameter adjustment factors in the initialization process are obtained, and the initial values of the obtained n power parameter adjustment factors are determined as the power parameter adjustment factors of n groups, or according to the difference between the amplitude of the conventional signal and the amplitude of the label signal, the power parameter adjustment factors of n groups are determined.

In an embodiment of the present invention, the transmitter device can directly determine the initial value of n power parameter adjustment factors in the initialization process as the power parameter adjustment factors of n groups. Alternatively, according to the difference between the amplitude of the conventional signal and the amplitude of the label signal, the transmitter device multiplies the power of the last transmitted signal by a random value on the basis of the power of the last transmitted signal to determine the power parameter adjustment factor as n groups.

As an optional implementation, the method also includes: if the difference between the amplitude of the conventional signal and the amplitude of the label signal does not meet the requirements, and the bit error rate of the conventional signal does not meet the requirements, the power parameter adjustment factor for determining n packets is executed.

In wireless communication, there are two main indicators to judge the performance of a receiving device: drop-call rate and bit error rate. The bit error rate represents the difference between the original information signal and the real information signal transmitted by the transmitter after receiving the signal and demodulating and decoding the signal. The stronger the noise, the more likely the error code will occur in the process of signal reception and decision. On the contrary, the weaker the noise, the more accurate the signal reception and decision will be, and the smaller the error code rate will be. Generally, the label signal will be used as a noise signal to destroy the transmission of the conventional signal, and the degree of destruction depends on the power parameter adjustment factor of the label signal. In the illustrated embodiment of the present invention, the degree of SNR sacrifice of half of the information signal is reflected by the parameter $\beta$, while the SNR of the other half of the information signal is enhanced by the parameter $\alpha$, while the overall information signal SNR has not changed, which is consistent with the SINR of the conventional signal.

In this optional implementation, a BER (Bit Error Rate) threshold can be preset, where the BER threshold can be the best experimental value obtained when the BER curve of the received signal of the receiving device is not affected by many experiments in advance, such as a BER threshold of 0.1. When the receiver determines that the error rate of the conventional signal is less than the error rate threshold, the error rate curve of the received signal is not affected. At this time, the receiver can determine that the error rate of the conventional signal meets the requirements. However, if the BER of conventional signal is greater than the BER threshold, when the BER curve of received signal is affected, the receiver equipment can determine that the BER of conventional signal does not meet the requirements.

According to the above analysis, the receiving device can send feedback information to the transmitting device, which is used to indicate whether the difference between the amplitude of the conventional signal and the amplitude of the label signal meets the requirements, and whether the error rate of the conventional signal meets the requirements. Furthermore, the transmitting device can determine the transmission power of the next signal based on the feedback information. For example, suppose that the feedback information is expressed in two digits (0 and 1), 0 is consistent, and 1 is inconsistent. Feedback information 00 can be used to indicate that the difference between the amplitude of conventional signal and that of label signal meets the requirements, and the error rate of conventional signal meets the requirements. Feedback information 01 can be used to indicate that the difference between the amplitude of conventional signal and that of label signal meets the requirements, but the error rate of conventional signal does not meet the requirements. Feedback information 10 indicates that the difference between the amplitude of conventional signal and the amplitude of label signal does not meet the requirements, but the error rate of the conventional signal meets the requirements, while 11 indicates that the difference between the amplitude of conventional signal and the amplitude value of label signal does not meet the requirements, and the error rate of conventional signal does not meet the requirements.

In step 203, the transmitter device determines the power parameter adjustment factor of the remaining packet according to the power parameter adjustment factor of the n packets and the energy limitation condition of the signal power to be transmitted.

According to the principle that the total energy of the signal does not change before and after adjustment, when adjusting the power parameter, the power parameter adjustment factor of the signal to be transmitted needs to satisfy the energy limitation condition, such as: $\alpha^2/2+\beta^2/2=1$.

According to the power parameter adjustment factor of the n packets and the energy limitation condition of the signal power to be transmitted, the transmitter device can unambiguously determine the power parameter adjustment factor of the remaining packets.

Figure 3:
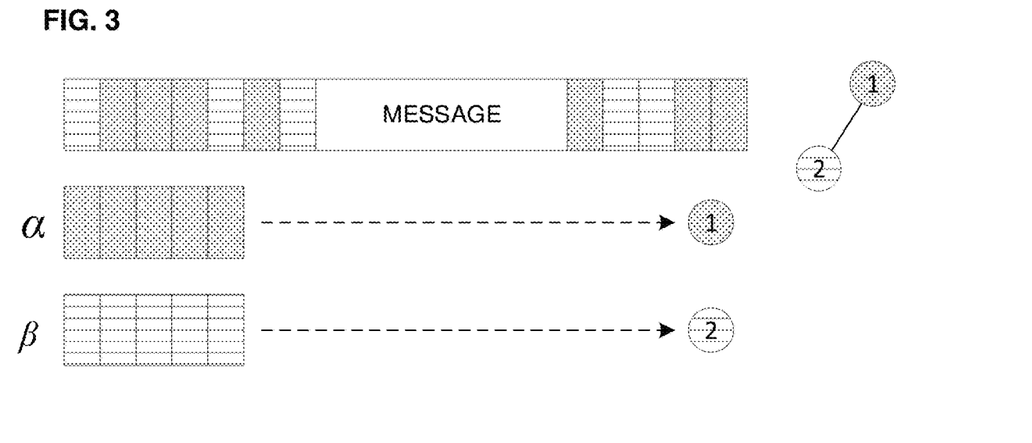
FIG. 3 is a schematic diagram of a power allocation mechanism of a signal according to some embodiments.

In Step 204: For each of the packets, the transmitting device adjusts the power of to-be-transmitted signal according to the corresponding power parameter adjustment factor. Please refer to FIG. 3 together. FIG. 3 is a schematic diagram of a power distribution mechanism of a signal according to an embodiment. As shown in FIG. 3, the signal is divided into two packets, that is, the first packet and the second packet. The transmitting device may multiply the signal power of the first packet by the power parameter adjustment factor $\alpha$ and multiply the signal power of the second group by the power parameter adjustment factor $\beta$ to adjust the signal power for each group. Among them, the condition $0\leq\beta1<\alpha$ should be met. The two tag signals may be expressed as follows:

$$x_{i,1}(l_1)=\alpha s_i(l_1)$$

$$x_{i,2}(l_2)=\alpha s_i(l_2) \quad (1.5)$$

where $l_1 \neq l_2 \in \{1, \ldots, L/2\}$ represents the subscript of each group. The lengths of signals in packets $x_{i,1}$ and $x_{i,2}$ are both L/2 and $\alpha$ and $\beta$ also need to satisfy the energy-limited condition of the signal power, that is, $\alpha^2/2+\beta^2/2=1$, so the ranges of $\alpha$ and $\beta$ may be further changed to $0\leq\beta<1<\sqrt{2}$.

In Step 205, the transmitting device sends the to-be-transmitted signal with power adjusted.

In the embodiment, after the transmitter device performs power adjustment on each packet, a certain power allocation feature may be formed, and the to-be-transmitted signal with power adjusted is sent to the receiving device. The power allocation feature may include: a tag signal, a power parameter adjustment factor, and a packet mode (i.e., which locations are selected). It should be noted that the signal to be transmitted after power adjustment is sent in the form of a whole combination.

In the method flow described in FIG. 2, before transmitting the to-be-transmitted signal, the transmitting device may use the key agreed by the two parties to divide the transmitted signals into multiple packets, and use the determined power parameter adjustment factor to adjust the signal power of each packets. Then, after transmitting the signal after power adjustment, the authentication information is not exposed in the whole process, which can improve the covertness of authentication information.

Figure 4:
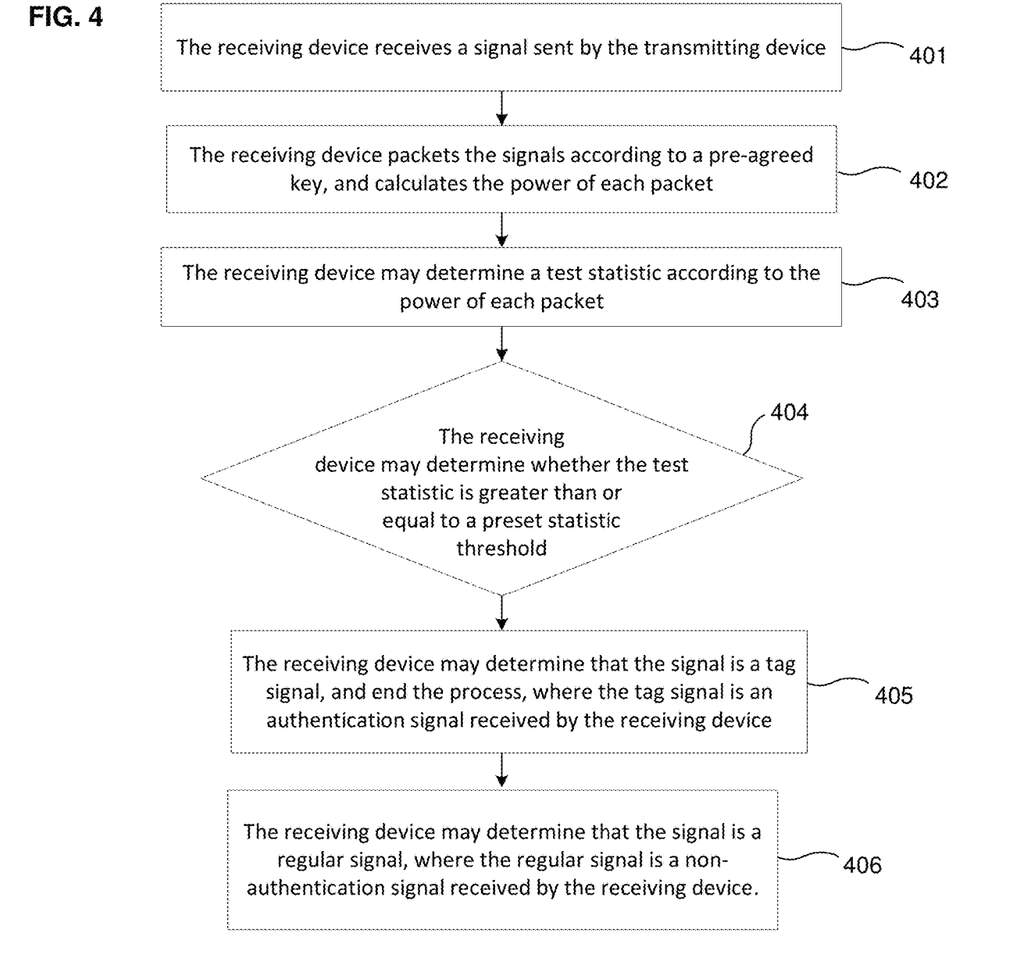
FIG. 4 is a schematic flowchart of a wireless communication method according to some embodiment of the present invention.

The wireless communication method may be applicable to a receiving device as well. As shown in FIG. 4, the wireless communication method may include the following steps:

In step 401, the receiving device receives a signal sent by the transmitting device.

In one embodiment, the received signal sent by the receiving device may be expressed as:

$$y_{i,1} = h_i x_{i,1} + n_{i,1}$$

$$y_{i,2} = h_i x_{i,2} + n_{i,2} \quad (1.6)$$

At this time, the SINR (signal-to-interference-plus-noise ratio) of the receiving device is, $$SINR_{Auth\text{-}SLO} = \frac{\|h_i\|^2(\alpha^2 + \beta^2)}{2\sigma_n^2} = \gamma_i \quad (1.7)$$

As may be seen from the above formulas, the superimposed tag signal does not sacrifice the SINR of the receiving device. At this time, for the receiving device, it is not necessary to estimate the channel parameter (channel fading); there is no need to compensate the channel; and the signal is not required to be demodulated and decoded either. The receiving device may authenticate the received signal by determining whether the received signal accords with the power distribution characteristics of the transmitting device.

In step 402, the receiving device groups the signals according to a pre-agreed key, and calculates the power of each packet.

In this embodiment, the receiving device may determine a power allocation feature of the signal, that is, the power of each packet, according to a pre-agreed key.

The two packets described above are taken as an example, the power of the first packet is expressed as $$\tau_{i,1} = y_{i,1}^H y_{i,1} / \left(\frac{L}{2}\right),$$

the power of the second packet is expressed as $$\tau_{i,2} = y_{i,2}^H y_{i,2} \left(\frac{L}{2}\right),$$

where $y_{i,1}^H$ is a conjugate transpose of $y_{i,1}$, i is the sequence number of the received data block, and 1 is the signal corresponding to the first packet. Further, $$\tau_{i,1} = \frac{1}{L/2}(h_i x_{i,1} + n_{i,1})^H (h_i x_{i,1} + n_{i,1}) \quad (1.8)$$

$$= \frac{1}{L/2}\sum_{k=1}^{L/2}(\|h_i x_{i,1}(l_{1,k})\|^2 + \|n_{i,1}(l_{1,k})\|^2)$$

$$= \frac{1}{L/2}\sum_{k=1}^{L/2}(\|h_i \alpha s_i(l_{1,k})\|^2 + \|n_{i,1}(l_{1,k})\|^2)$$

$$\tau_{i,2} = \frac{1}{L/2}(h_i x_{i,2} + n_{i,2})^H (h_i x_{i,2} + n_{i,2}) \quad (1.9)$$

$$= \frac{1}{L/2}\sum_{k=1}^{L/2}(\|h_i x_{i,2}(l_{2,k})\|^2 + \|n_{i,2}(l_{2,k})\|^2)$$

$$= \frac{1}{L/2}\sum_{k=1}^{L/2}(\|h_i \alpha s_i(l_{1,k})\|^2 + \|n_{i,1}(l_{1,k})\|^2)$$

where $x_{i,1}$ and $n_{i,1}$ and are independent of each other.

In Step 403, the receiving device may determine a test statistic according to the power of each packet.

In one embodiment, after determining the power of each packet, the receiving device may determine the test statistic according to the power of each packet. The test statistic may be expressed as: $\tau_i = \tau_{i,1} - \tau_{i,2}$.

In Step 404, the receiving device may determine whether the test statistic is greater than or equal to a preset statistic threshold. If the test statistic is greater than or equal to a preset statistic threshold, go to step 405. If the test statistic is less than the preset statistic threshold, go to step 406.

In this embodiment, the statistic threshold for determining whether the signal is a regular signal or a tag signal may be obtained through a plurality of tests in advance, and the statistic threshold could be expressed as $\tau_i^0$.

In Step 405, the receiving device may determine that the signal is a tag signal, and end the process, where the tag signal is an authentication signal received by the receiving device.

In this embodiment, if the receiving device determines that the test statistic is greater than or equal to the preset statistic threshold, the signal may be determined to be a tag signal. In this case, the test statistic $\tau_i$ may be expressed as follows:

$$\tau_i | H_1 = \frac{1}{L/2}\sum_{k=1}^{L/2}(\|h_i \alpha s_i(l_{1,k})\|^2 - \quad (1.10)$$

$$\|h_i \beta \rho_s s_i(l_{2,k})\|^2 + \|n_{i,1}(l_{1,k})\|^2 - \|n_{i,2}(l_{2,k})\|^2) =$$

$$\frac{1}{L/2}\sum_{k=1}^{L/2}[\|h_i\|^2(\alpha^2\|s_i(l_{1,k})\|^2 - \beta^2\|s_i(l_{2,k})\|^2) +$$

$$\|n_{i,1}(l_{1,k})\|^2 - \|n_{i,2}(l_{2,k})\|^2]$$

In Step 406, the receiving device may determine that the signal is a regular signal, where the regular signal is a non-authentication signal received by the receiving device.

In this embodiment, if the receiving device determines that the test statistic is less than the preset statistic threshold, the signal may be determined to be a regular signal. In this case, the test statistic $\tau_i$ may be expressed as follows:

$$\tau_i | H_0 = \frac{1}{L/2}\sum_{k=1}^{L/2}(\|n_{i,1}(l_{1,k})\|^2 - \|n_{i,2}(l_{2,k})\|^2) \quad (1.11)$$

This authentication technology may therefore be referred to as a slope authentication technology (Auth-SLO).

In the method shown in FIG. 4, the receiving device may use the key agreed by the two parties to identify whether the received signal satisfies the power allocation feature, to achieve the purpose of information authentication. The whole process of signal transmission and reception does not expose the authentication information, which can improve the concealment of signal transmission and the accuracy of information authentication.

Figure 5:
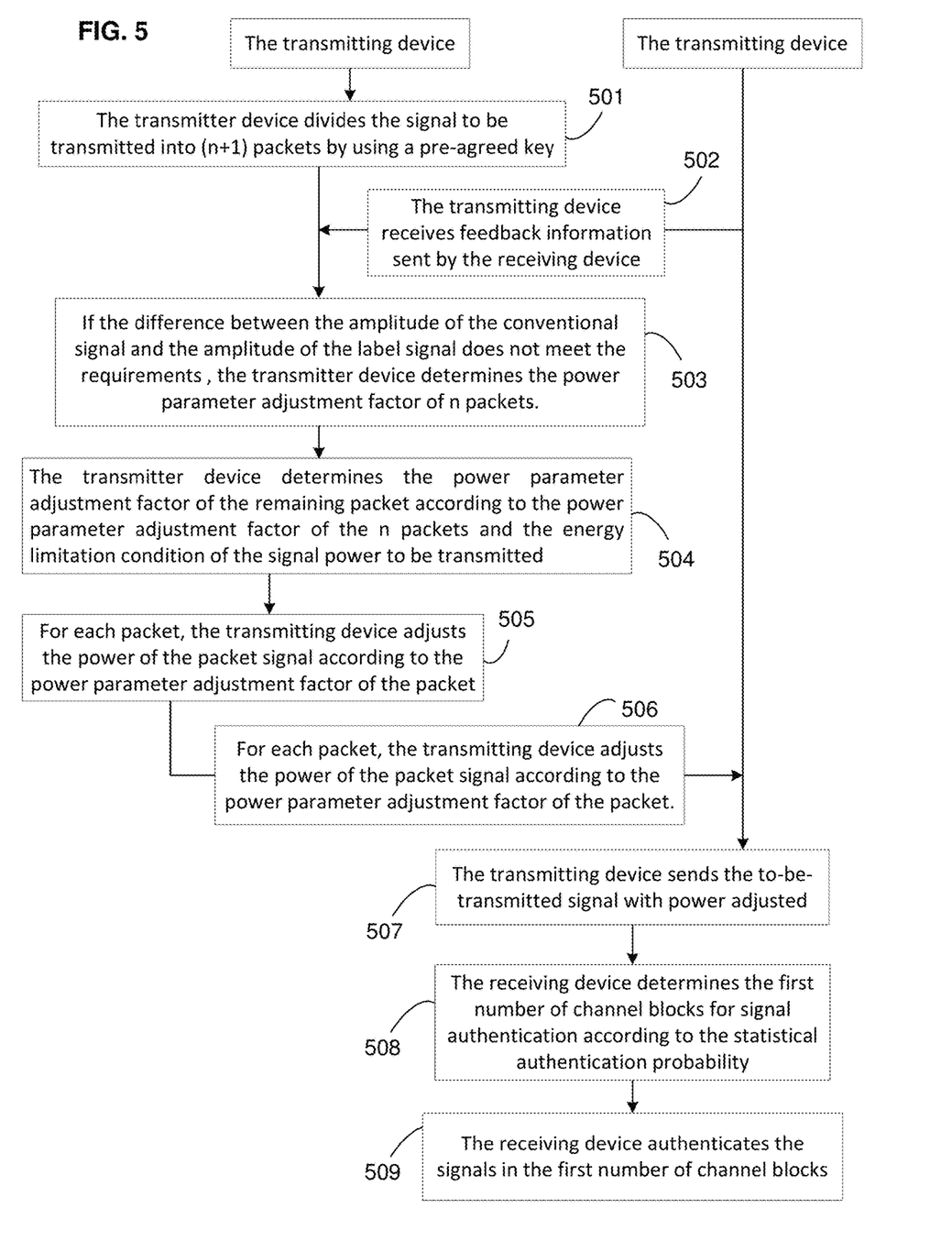
FIG. 5 is a schematic flowchart of a wireless communication method according to some embodiments.

Referring to FIG. 5, FIG. 5 is a schematic flowchart diagram of an another wireless communication method according to an embodiment. The wireless communication method is described for a combined system of both the transmitting device and the receiving device. As shown in FIG. 5, the wireless communication method may include the following steps:

In Step 501, the transmitter device divides the signal to be transmitted into (n+1) packets by using a pre-agreed key.

In Step 502. The transmitting device receives feedback information sent by the receiving device.

The feedback information is used to indicate whether the difference between the amplitude of a conventional signal and that of a label signal meets the requirements.

In Step 503, if the difference between the amplitude of the conventional signal and the amplitude of the label signal does not meet the requirements, so the transmitter device determines the power parameter adjustment factor of n packets.

In Step 504, the transmitter device determines the power parameter adjustment factor of the remaining packet according to the power parameter adjustment factor of the n packets and the energy limitation condition of the signal power to be transmitted.

In Step 505, for each of the packets, the transmitting device adjusts the power of to-be-transmitted signal according to corresponding power parameter adjustment factor.

In Step 506, the transmitting device sends the to-be-transmitted signal with power adjusted. In Step 507, the receiving device groups the signals according to the pre-agreed key, and calculates the power of each packet.

In Step 508, the receiving device may determine a test statistic according to the power of each of the packets.

In Step 509, the receiving device may determine whether the test statistic is greater than or equal to a preset statistic threshold. If the test statistic is greater than or equal to the preset statistic threshold, the receiving device determines that the signal is a tag signal; and if the test statistic is less than the preset statistic threshold, the receiving end device determines that the signal is a regular signal.

Figure 6:
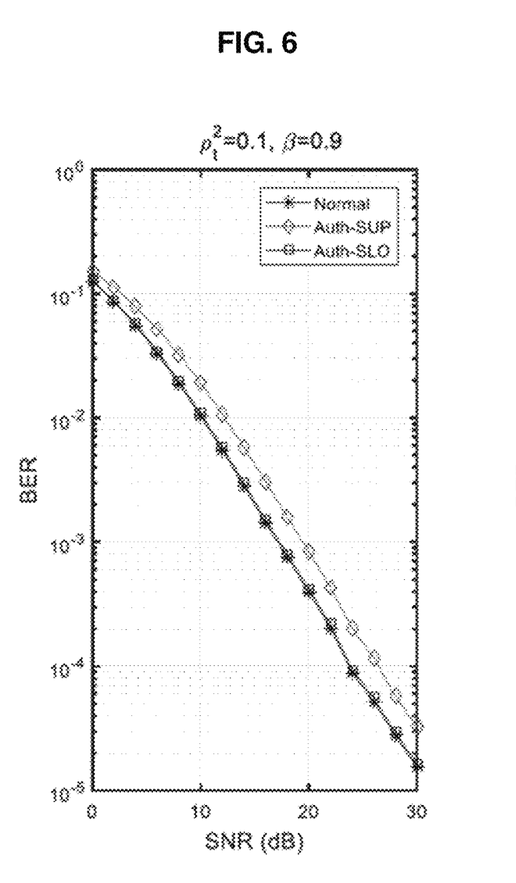
FIG. 6 is a curve diagram of the variation of bit error rate of various signals with SNR.
Figure 7:
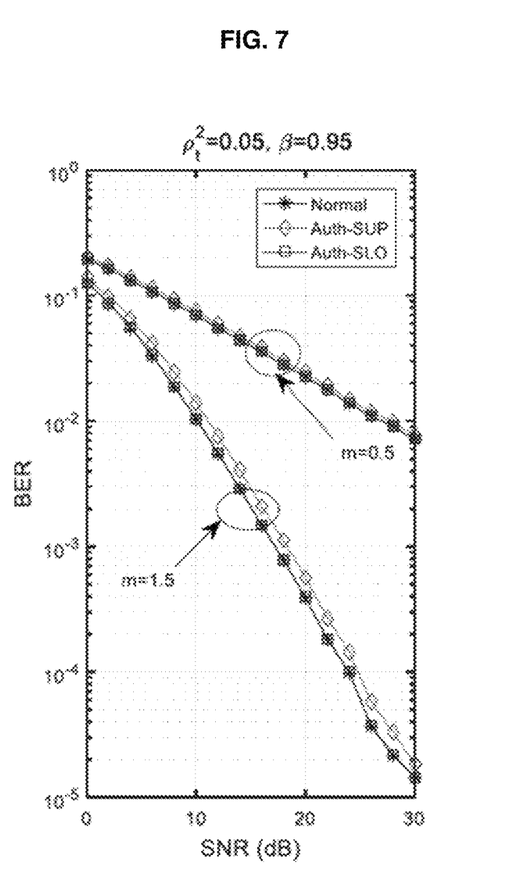
FIG. 7 is a curve diagram of the change of bit error rate with SNR of another kind of signals.

See also FIGS. 6 and 7. FIG. 6 is a diagram showing the variation in bit error rate relative to the signal-to-noise ratio for a variety of signals disclosed in the embodiment of the present invention, and FIG. 7 is a diagram showing the variation in bit error rate relative to the signal-to-noise ratio of another variety of signals disclosed in the embodiment of the present invention. FIGS. 6 and 7 show the BER curves of three kinds of signals (conventional signal, Auth-SUP signal and Auth-SLO signal) varying with SNR. Among them, Auth-SUP signal is the label signal using an Auth-SUP algorithm and Auth-SLO signal is the label signal using the Auth-SLO algorithm. In FIG. 6, $\tau_t=0.1$, $\beta=0.9$, where $\tau_t$ is the power parameter adjustment factor when the tag signal is added using the Auth-SUP method, and $\beta$ is the power parameter adjustment factor when the tag signal is added in the invention. In FIG. 7, $\tau_t=0.05$, $\beta=0.95$, for m=1.5 and m=0.5, where m is a channel fading parameter. As can be seen from FIGS. 6 and 7, the BER curves obtained by adding label signals are consistent with those without label signals. Even if the illegal monitoring equipment can obtain accurate noise statistics and fading characteristics, it is thus not easy to discover that the signal already contains the label signal, which makes the legitimate signal not easy to be attacked or counterfeited. In addition, it can be seen from FIGS. 6 and 7 that the Auth-SLO authentication technology proposed by the present invention has little effect on the BER of the received signal of the receiving device when $\beta \geq 0.9$ is used. Therefore, in order to ensure the concealment of wireless communication physical layer authentication technology, the transmitter should make $\beta \geq 0.9$ when adjusting the power.

Compared with the existing wireless communication physical layer authentication technologies (Auth-SS, Auth-SUP, Auth-TDM), using the Auth-SLO authentication technology described above, the wireless communication physical layer may be authenticated without occupying additional signal bandwidth. At the same time, the tag signal does not affect noise extraction and noise statistical characteristics in the receiving device. In addition, the security of the Auth-SLO authentication technology described herein is higher than that of the prior art, both in terms of spectrum characteristics analysis and impact on other users in the communication scenario.

In the method described in FIG. 5, before transmitting the to-be-transmitted signal, the transmitting device may use the key agreed by the two parties to divide the transmitted signals into multiple packets, and use the determined power parameter adjustment factor to adjust the signal power of each packets. At the same time, the receiving device may also use the key agreed by the two parties to identify whether the received signal satisfies the power allocation feature of the signal transmitted by the transmitting device to achieve the purpose of information authentication. The whole process does not expose the authentication information, which can improve the concealment of signal transmission, and at the same time, improve the accuracy of information authentication.

Figure 8:
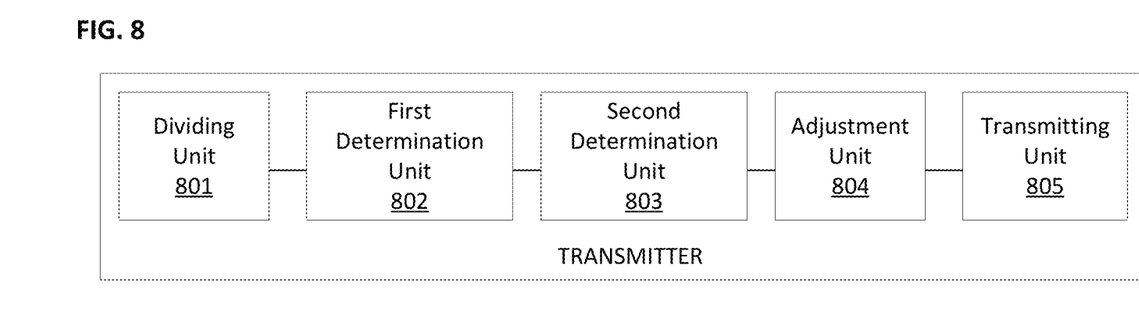
FIG. 8 is a schematic structural diagram of a wireless communication apparatus according to some embodiments.

Please refer to FIG. 8. FIG. 8 is a schematic structural diagram of a wireless communication apparatus according to one embodiment, in which the wireless communication apparatus runs on the transmitting device. The wireless communication apparatus described in FIG. 8 may perform some or all of the steps in the wireless communication method described in FIG. 2 and FIG. 5. As shown in FIG. 8, the wireless communication apparatus may include:

A dividing unit 801, to divide the signal to be transmitted into (n+1) groups by using the pre-agreed key, where n is a positive integer; a first determination unit 802, to determine the power parameter adjustment factor of n packets if the difference between the amplitude value of the conventional signal and the amplitude value of the label signal does not meet the requirements, in which the conventional signal is a non-authenticated signal received by the receiving device and the label signal is an authenticated signal received by the receiving device; a second determination unit 803, to determine the power parameter adjustment factor of the remaining packet according to the power parameter adjustment factor of the n packets and the energy limitation condition of the power of the signal to be transmitted; an adjusting unit 804, which adjusts the power of the signal of the packet according to a power parameter adjustment factor of the packet for each of the packets; and a transmitting unit 805, which sends the to-be-transmitted signal with the power adjusted.

Optionally, the first determination unit 802 may also be used to determine the power parameter adjustment factor of N packets if the difference between the amplitude of the conventional signal and the amplitude of the label signal does not meet the requirements and the bit error rate of the conventional signal does not meet the requirements.

Optionally, the first determination unit 802 determines the power parameter adjustment factors of n packets by including the following: The initial values of n power parameter adjustment factors in the initialization process are obtained, and the initial values of the obtained n power parameter adjustment factors are determined as the power parameter adjustment factors of n groups, or, according to the difference between the amplitude of the conventional signal and the amplitude of the label signal, the power parameter adjustment factors of n groups are determined.

In the wireless communication apparatus described in FIG. 8, before transmitting the to-be-transmitted signal, the transmitting device may use the key agreed by the two parties to divide the transmitted signals into multiple packets, and use the determined power parameter adjustment factor to adjust the signal power of each packets. Then, after transmitting the adjusted power signal, the whole process does not expose the authentication information, which can improve the covertness of signal transmission, and at the same time, improve the accuracy of information authentication.

Figure 9:
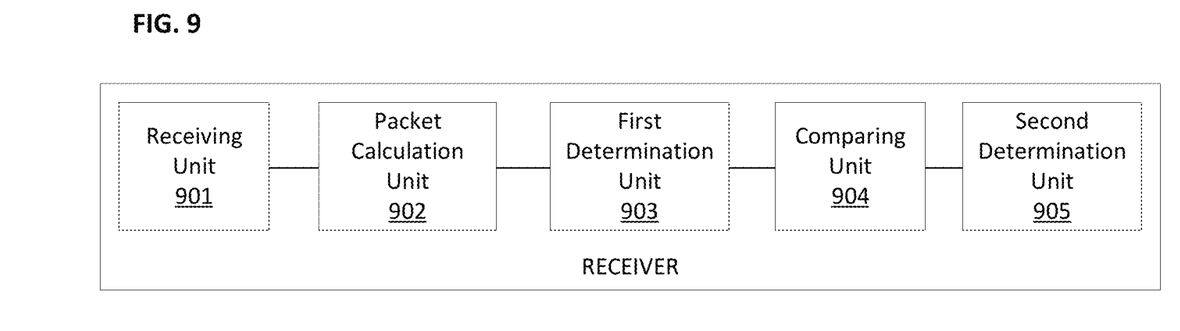
FIG. 9 is a schematic structural diagram of a wireless communication apparatus according to some embodiments.

Please refer to FIG. 9. FIG. 9 is a schematic structural diagram of another wireless communication apparatus according to an embodiment. The wireless communication apparatus shown in FIG. 9 may be applied in a receiving device. The wireless communication apparatus described in FIG. 9 may perform some or all of the steps in the wireless communication method described in FIG. 4 and FIG. 5. As shown in FIG. 9, the wireless communication apparatus may include:

A receiving unit 901 that receives a signal sent by the transmitting device; a packet calculation unit 902, which groups the signals according to the pre-agreed key, and calculates powers for each packet; a first determination unit 903, which determines a test statistic according to the power of each of the packets; a comparing unit 904, which checks whether the test statistic is greater than or equal to a preset statistic threshold; a second determining unit 905, which determines that the signal is a tag signal if the comparing unit 904 determines that the test statistic is greater than or equal to a preset statistic threshold. The tag signal is an authentication signal received by the receiving device. The second determining unit 905 may further determine that the signal is a regular signal if the comparing unit 904 determines that the test statistic is less than the statistic threshold. The regular signal is a non-authentication signal received by the receiving device.

In the wireless communication apparatus described in FIG. 9, the pre-agreed key may be used to identify whether the received signal satisfies the power allocation feature. The whole process of signal transmission and reception does not expose the authentication information, which can improve the concealment of signal transmission and the accuracy of information authentication.

In the above embodiments, the descriptions of the various embodiments are all focused on, and the parts that are not detailed in a certain embodiment may be referred to the related descriptions of other embodiments.

In the several embodiments provided herein, it should be understood that the disclosed apparatus may be implemented in other ways. For example, the device embodiments described above are merely illustrative. For example, the division of the unit is only a logical, functional division, and the actual implementation may be divided differently. For example, multiple units or components may be combined or integrated into another system, or some features may be omitted or not implemented at all. In addition, the coupling or direct coupling or communication connection shown or discussed may be an indirect coupling or communication connection through some interface, device or unit, and may be electrical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of an embodiment.

In addition, each functional unit in each embodiment may be integrated into one processing unit, or each unit may exist physically separately, or two or more units may be integrated into one unit. The above integrated unit may be implemented in the form of hardware or in the form of a software functional unit.

The integrated unit, if implemented in the form of a software functional unit and sold or used as a standalone product, may be stored in a computer-readable memory. Based on such understanding, the technical solution of the disclosure may contribute to the prior art or all or part of the technical solution may be embodied in the form of a software product. The computer software product is stored in a memory and includes instructions for causing a computer device (which may be a personal computer, server or network device, etc.) to perform all or part of the steps of the methods described in various embodiments of the disclosure. The foregoing memory includes: a U disk, a Read-Only Memory (ROM), a Random Access Memory (RAM), a removable hard disk, a magnetic disk, or an optical disk, and the like, which may store program codes.

One of ordinary skill in the art will appreciate that all or part of the various steps of the above-described embodiments may be accomplished by a program instructing the associated hardware. The program may be stored in a computer readable memory, and the memory may include: a flash disk, a read-only memory (ROM), a random access memory (RAM), disk or CD, etc.

The wireless communication method and apparatus described for the various embodiments are described in detail above. The principles and embodiments of the disclosure have been described herein with reference to specific examples, and the description of the above embodiments is only to assist in understanding the method of the disclosure and its core idea. At the same time, for the general technician in this field, there will be some changes in the specific implementation and application scope according to the idea of this disclosure. In summary, the contents of this specification should not be understood as a limitation to the disclosure.

The invention claimed is:
1. A wireless communication method, comprising:
dividing a to-be-transmitted signal into (n+1) packets using a key pre-agreed to by a transmitter and a receiver, where n is a positive integer, said to-be-transmitted signal comprising a regular signal and a tag signal, said tag signal forming an authentication signal;
when a difference between an amplitude value of the regular signal and an amplitude value of the tag signal does not meet a first pre-determined requirement, determining first power parameter adjustment factors of the n packets preceding an (n+1)th packet;
determining a second power parameter adjustment factor for the (n+1)th packet and an energy-limited condition of the to-be-transmitted signal power;

adjusting power of the respective (n+1) packets according to the corresponding power parameter adjustment factor; and transmitting the to-be-transmitted signal after said power adjustment.

2. The method of claim 1, further comprising repeatedly determining and readjusting the first power parameter adjustment factors until the difference between the amplitude value of the regular signal and the amplitude value of the tag signal meets the first pre-determined requirement and an error rate of the regular signal meets a second requirement.

3. The method of claim 2, comprising determining the second power parameter adjustment factor by subtracting a sum of transmission power of the n packets preceding the (n+1)th packet from the to-be-transmitted signal power.

4. The method of claim 1, comprising, in a receiver, authenticating a received signal, formed from the to-be-transmitted signal, by comparing the amplitude of different ones of the (n+1) packets.

5. A method for wireless communication reception, comprising:

receiving a signal sent by a transmitting device, said signal comprising a regular signal and a tag signal and including packets grouped according to a pre-agreed key according to which power of each of the packets is determined, said tag signal forming an authentication signal;

computing a test statistic based on the power of each of the packets; and identifying the tag signal by comparing the test statistic to a predetermined threshold value.

6. The method of claim 5, further comprising identifying the regular signal by comparing the test statistic to the predetermined threshold value.

7. The method of claim 6, further comprising, until a difference between amplitude values of the regular signal and tag signal meets a first pre-determined requirement and an error rate of the regular signal meets a second requirement, repeatedly transmitting back to the transmitting device amplitude information about received amplitudes of the regular signal and the tag signal, said amplitude information forming an input into a routine for readjusting power parameter adjustment factors for the packets.

8. A wireless communication transmitting device comprising:

a) a dividing unit, configured to divide a to-be-transmitted signal into (n+1) packets, comprising an (n+1)th packet and n packets preceding the (n+1)th packet, by using a pre-agreed key, where n is a positive integer, said to-be-transmitted signal comprising a regular signal and a tag signal, said tag signal forming an authentication signal;

b) a first determining unit, configured to determine first power parameter adjustment factors for the n packets if a difference between an amplitude value of the regular signal and an amplitude value of the tag signal fails to meet a threshold requirement;

c) a second determining unit, configured to determine a second power parameter adjustment factor for the (n+1) th packet according to an energy-limited condition of the to-be- transmitted signal power;

d) an adjusting unit, configured to perform power adjustment according to the corresponding power parameter adjustment factors; and e) a transmitting unit, configured to send the to-be-transmitted signal after power adjustment.

9. The transmitting device according to claim 8, in which the first determining unit is further configured:

to obtain initial values of the first power parameter adjustment factors in an initialization phase; and to repeatedly determine and readjust the first power parameter adjustment factors until the difference between the amplitude value of the regular signal and the amplitude value of the tag signal meets a first pre-determined requirement and an error rate of the regular signal meets a second requirement.

10. The transmitting device according to claim 9, in which the second determining unit is further configured to determine the second power parameter adjustment factor by subtracting a sum of transmission power of the n packets preceding the (n+1)th packet from the to-be-transmitted signal power.

* * * * *